Patented Oct. 20, 1925.

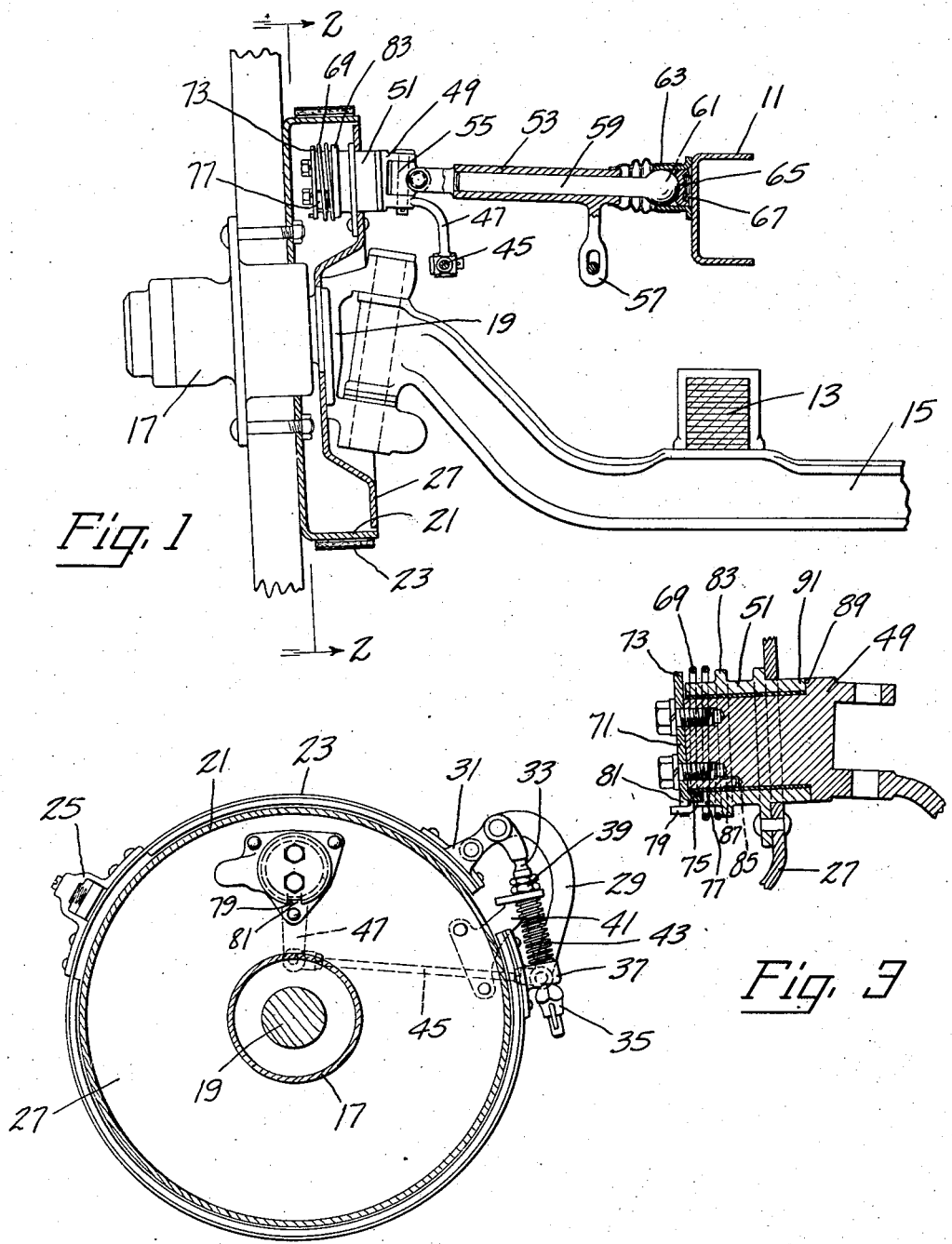

1,557,969

UNITED STATES PATENT OFFICE.

CLIFFORD ARCHIE BOOM, OF FLINT, MICHIGAN, ASSIGNOR TO GENERAL MOTORS CORPORATION, OF DETROIT, MICHIGAN, A CORPORATION OF DELAWARE.

MOTOR VEHICLE.

Application filed August 14, 1924. Serial No. 732,026.

*To all whom it may concern:*

Be it known that I, CLIFFORD ARCHIE BOOM, a citizen of the United States, and a resident of Flint, county of Genesee, and State of Michigan, have invented certain new and useful Improvements in Motor Vehicles, of which the following is a full, clear, concise, and exact description, such as will enable others skilled in the art to which the invention relates to make and use the same, reference being made therein to the accompanying drawings, which form a part of this specification.

This invention relates to brakes, and is illustrated as embodied in a front wheel brake controlling mechanism.

An object of the invention is to provide a simple and efficient spring device for the brake operating rock shaft. In one desirable arrangement, the rock shaft is provided with a coil spring which prevents rattling, especially after the parts have become worn. The spring also serves as a torsional spring to return the brake operating connections to their idle position when the pressure of the service pedal is removed.

The above and other objects and features of the invention will be apparent from the following description of the illustrated embodiment shown in the accompanying drawings, in which:

Figure 1 is a vertical transverse section showing one of the front brakes with operating mechanism;

Figure 2 is a section on line 2—2 of Figure 1; and

Figure 3 is a sectional view of one end of the rockshaft.

The construction shown in the drawings, selected for illustrating my invention includes a frame 11, supported in any suitable manner by a spring 13 on the front axle 15. The front wheel 17 is journaled on a spindle carried by a knuckle 19 and carries a brake drum 21 surrounded by a brake band 23 supported by an anchor 25 on a plate 27 carried by the knuckle 19.

The band 23 is contracted in applying the brakes, by a toggle lever 29 pivoted to lug 31 carried by one end of the band, and by a link 33 having an adjustable abutment 35 engaging a lug 37 on the other end of the band, through which lug the link 33 passes. The link carries an adjustable stop 39 which determines the idle position of the band by engaging with a bracket 41 carried by the plate 27 and the brake band is urged away from the drum by a spring 43 surrounding the link 33 and confined between lug 37 and bracket 41.

The toggle lever 29 is connected to the brake operating mechanism by a rigid link 45 to an arm 47 depending from a flexible operating shaft including a cylindrical part 49 carrying the arm 47 and journaled in a bushing 51 carried by plate 27, the arm 47 being substantially vertical when the brakes are on. The flexible operating shaft also includes a sleeve member 53 connected to the part 49 by a universal joint 55 and provided with a brake operating arm 57. The sleeve member 53 is supported by a sliding rod or shaft 59 having a ball head 61 universally held in a socket 63 on the adjacent side of the frame member 11, the head 61 being held against undesirable play by a follower 65 held by a spring 67.

A torsion spring 69 has its opposite ends connected to the bushing 51 and to a plate 71 carried by the part 49. The removable plate 71 extends beyond the circumference of the bushing forming a flange 73. A portion of this flange 75 is bent toward the bearing and engages a slot 77 in the end of said bushing, serving as a stop to limit the angular movement of the flexible operating shaft including the cylindrical part 49. The end 79 of the spring 69 is secured to the plate 71 by engaging the slot 81 formed by the bent out portion 75. The bushing is shown provided with a flange 83 having an aperture 85 to receive the opposite end 87 of the spring 69. Thus it will be understood that the torsion spring carried between the two flanges 83 and 73, one a stationary member and the other a movable member, urges the movable member axially and angularly within the bearing 51, yieldingly holding a flange 89, on the part 49, against the end 91 of the bearing 51, and yieldingly holding the flexible shaft in its predetermined or initial position with the stop 75 engaging one end of the slot 77. It will also be seen that the spring prevents rattle and takes up for any wear of the bushing or moving part.

While one illustrated embodiment of the invention has been described, it is not my intention to limit its scope to that embodiment, or otherwise than by the terms of the appended claims.

I claim:

1. A brake comprising, in combination, frictionally engaging members, and connections controlling the engagement of said members including a rock member, a support, and means acting on said support and rock member urging the rock member angularly to its initial position and urging it axially against the support to prevent rattle and take up for wear.

2. A brake comprising, in combination, frictionally-engaging members, and connections controlling the engagement of said members including a rock member, a support, and a torsional spring acting on said support and rock member yieldingly urging the rock member angularly to its initial position and yieldingly urging it axially against the support to prevent rattle and take up for wear.

3. A brake comprising, in combination, frictionally-engaging members, and connections controlling the engagement of said members including a rock member, a support, a stop carried by said rock member engaging a slot in the support for limiting the return movement of said rock member.

4. A brake comprising, in combination, frictionally-engaging members, and connections controlling the engagement of said members including a rock member, a support, a spring acting between the support and rock member to urge the rock member axially and to resiliently hold the rock member in a predetermined angular position within the support.

5. A brake operating mechanism comprising, a rock member, a support, flanges on the rock member at the opposite ends of said support, a resilient means located between one of said flanges and the support to engage the other flange against the adjacent end of said support.

In testimony whereof I affix my signature.

CLIFFORD ARCHIE BOOM.